Sept. 11, 1923.  1,467,349

G. B. A. ZIMMERMAN

AUTOMOBILE SIGNAL

Filed Dec. 15, 1922

INVENTOR
G. B. A. Zimmerman
BY
ATTORNEY

Patented Sept. 11, 1923.

1,467,349

UNITED STATES PATENT OFFICE.

GUSTAV BERTHOLD ARTHUR ZIMMERMAN, OF BELLMORE, NEW YORK.

AUTOMOBILE SIGNAL.

Application filed December 15, 1922. Serial No. 607,067.

*To all whom it may concern:*

Be it known that I, GUSTAV BERTHOLD ARTHUR ZIMMERMAN, a citizen of the United States, and a resident of Bellmore, Long Island, in the county of Queens, city and State of New York, have invented a new and useful Automobile Signal, of which the following is a specification.

The invention relates to slow or stop signals for closed body automobiles, and the object is to provide a device which is of a simple, mechanical nature, easily applied without injury to the car, which is convenient to use, and which, while occupying an exposed position, does not detract from the appearance of the vehicle, being substantially absorbed in the normal position into the frame of the body. To this end the invention may be said to comprise the device and the parts, improvements and combinations hereinafter described by reference to a preferred embodiment, and more particularly pointed out in the appended claims.

In the accompanying drawings, forming a part hereof:

Figure 1:
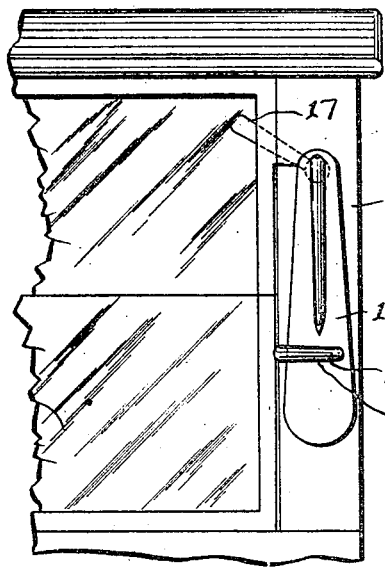
Fig. 1 is a fragmentary front elevation of a closed body with the signal applied thereto, the signal being shown in the normal or retracted position.
Figure 2:
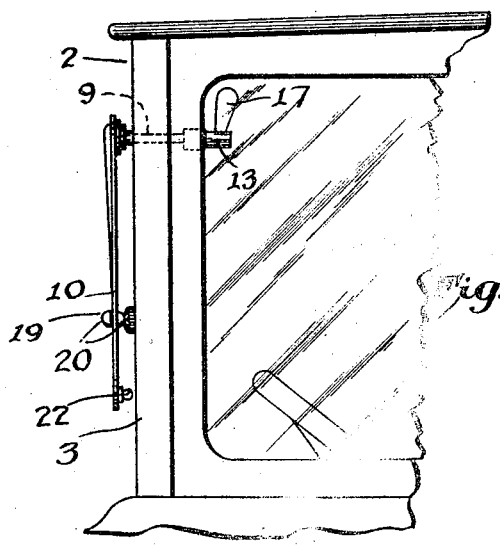
Fig. 2 is a fragmentary side elevation.

A closed automobile body is designated generally by the numeral 2, 3 being its left-hand front corner post or frame member. The application of the invention to the body requires the boring of just two holes 4 and 5 through this frame member, one being in the upper portion of the member and the other about midway of its height or somewhat lower.

In the upper hole, from the inside, there is inserted a tube or thimble 6, having a rear end flange 7 formed with screw holes whereby the thimble is secured to the post by small wood-screws 8. The front end of the thimble projects somewhat from the outer face of the body.

Figure 3:
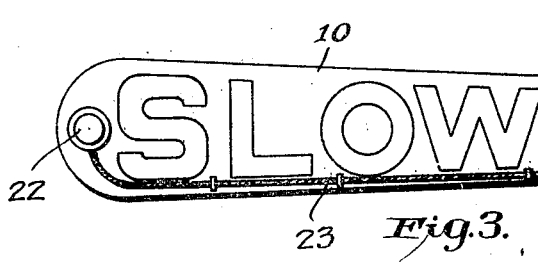
Fig. 3 is a fragmentary sectional rear elevation on a larger scale, showing the signal in the warning position.
Figure 4:
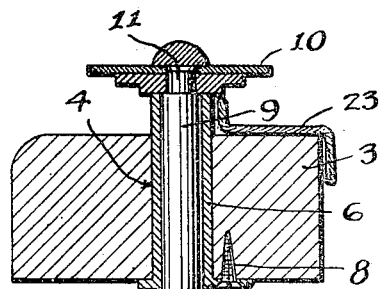
Fig. 4 is a horizontal sectional view taken in the plane of the pivotal axis of the semaphore.

A rock-shaft 9 passes through the thimble, and on its forward end is fixed a semaphore blade 10, which in the normal position extends vertically downward within the confines of the post member 3. A shoulder 11 on the forward part of the shaft, or it may be a part of the blade, bears frictionally against the front end of the thimble 6, the shaft being urged axially rearward by a spring 12 confined in compression on the rear portion of the shaft, between the flange 7 of the thimble and a shoulder or enlargement on the shaft. Such enlargement in this instance is a member 13 having a screw-threaded socket 14 whereby it is screwed onto a thread 15 on the rear end of the shaft proper, the member being fixed in the desired position on the shaft by a set-screw 16. An operating crank-handle 17 within the closed body is carried by this member, and may be frictionally knuckle-jointed thereto as shown at 18, so that in installing the device on the car the crank can be disposed substantially in line with the shaft in order to clear the side of the body during the screwing on of the member 13. The spring 12 holds the shaft and blade friction tight against rattling and is of such strength as to hold the blade in the horizontal position of Fig. 3 without the necessity of the driver keeping his hand on the crank. Means are thus provided for automatically keeping the signal in its warning position until the driver desires to restore it, and when restored it is kept from swinging with the movement of the car.

Figure 5:
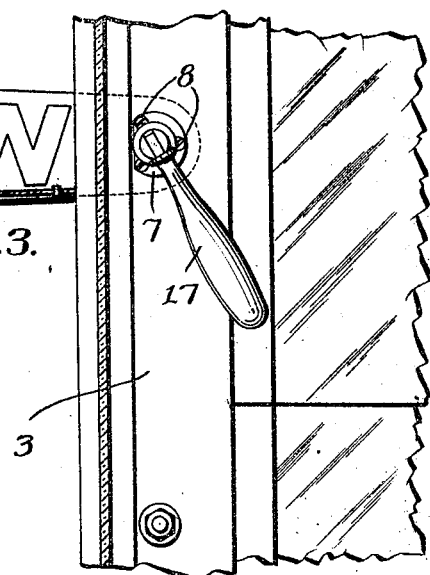
Fig. 5 is a horizontal section through the frame post, showing the retainer in plan.
Figure 5:
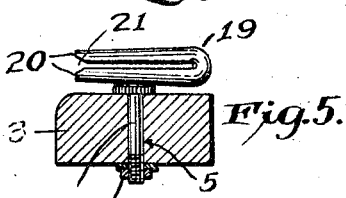

For further means of holding the blade in the normal position, a member 19 is mounted on the outer side of the post 3, below the thimble and rock-shaft, to embrace the lower or free portion of the blade. As seen most clearly in Fig. 5, this member is a narrow U-shaped part, disposed transversely, its limbs or jaws 20 separated by a slot into which the blade slips and by which it is confined when the blade is swung downward from the warning position to its vertical position. The entrance 21 to the slot faces outward, that is to say, toward the adjacent side of the body, and is flared by beveling the ends of the jaws at their inner sides. The member is carried by a stem 22, the front end of which is united to the middle of the rear jaw. Said stem is passed rearward through the lower hole 5 in the post member, and is screw-threaded at its inwardly projecting rear end to receive a nut 23, clamping it in place.

On its rear face, which is normally concealed, the blade may bear a warning inscription, and such face is preferably painted red the more readily to attract attention.

Owing to the relation whereby the blade when restored to normal position is retracted within the lines of the post 3, and particularly where its outer face is painted the same color as the body, as is preferably the case, the member 19 being also similarly painted, the device, except when signaling, is rendered inconspicuous.

The blade may carry a warning light 22 for use at night. Such light is mounted on the rear or inner side of the blade, where it is normally protected and concealed between the blade and the frame member 3. The conductor or conductors 23 may be led up alongside the post 3, or in any suitable manner, and across to the blade near its pivot.

What I claim as new is:

1. An automobile signal, comprising a cylindrical thimble to be inserted in a hole in a front frame member of a closed body, the thimble having an attaching flange at one end and being of a length to project slightly at the other end, a rock-shaft passing through the thimble carrying a semaphore blade at its outer end and an operating crank at its inner end, there being an abutment on the shaft to bear frictionally against one end of the thimble, and a spring acting longitudinally between the shaft and the other end of the thimble so as to hold the signal entirely by friction in any position.

2. A signal for application to the front corner portion of the frame of a closed automobile body, comprising a thimble adapted to be inserted in a hole in such frame portion, a rock-shaft passing through the thimble and bearing a semaphore blade at its forward end and a crank at its rear end, a spring interposed between the thimble and shaft and acting axially thereof, and a member having a stem adapted to be secured in a lower hole in the frame and a forward portion presenting two jaws spaced by a transverse slot to confine the blade in the vertical position.

3. An automobile signal, one part of which comprises a rock-shaft, a semaphore blade on the forward end thereof, and a crank on the rear end of the shaft, and the other part of which comprises a member having jaws spaced by a slot into which the free portion of the blade will slip, a stem to which the rear jaw of said member is united in transverse relation, and clamping means cooperative with the rear end of the stem, the two parts being adapted to be mounted in upper and lower holes in a front corner post of a closed body.

GUSTAV BERTHOLD ARTHUR ZIMMERMAN.